United States Patent
Hope

(10) Patent No.: US 8,988,357 B2
(45) Date of Patent: Mar. 24, 2015

(54) STYLUS ACTIVATED DISPLAY/KEY-LOCK

(75) Inventor: Julian Charles Hope, Bolton (GB)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1709 days.

(21) Appl. No.: 11/463,739

(22) Filed: Aug. 10, 2006

(65) Prior Publication Data

US 2008/0036747 A1 Feb. 14, 2008

(51) Int. Cl.
*G06F 3/041* (2006.01)
*G06F 3/033* (2013.01)
*G06F 1/16* (2006.01)
*G06F 3/02* (2006.01)

(52) U.S. Cl.
CPC ............... *G06F 1/1626* (2013.01); *G06F 3/02* (2013.01); *G06F 2200/1632* (2013.01)
USPC .......................................... 345/173; 345/179

(58) Field of Classification Search
USPC .................................. 345/179, 173
See application file for complete search history.

(56) References Cited

U.S. PATENT DOCUMENTS

| | | | |
|---|---|---|---|
| 5,396,443 A | 3/1995 | Mese et al. ..................... | 364/707 |
| 6,924,791 B1 * | 8/2005 | Nicolas et al. ................ | 345/179 |
| 7,046,237 B1 * | 5/2006 | Nicolas et al. ................ | 345/179 |
| 2002/0103616 A1 * | 8/2002 | Park et al. ...................... | 702/150 |
| 2004/0212586 A1 * | 10/2004 | Denny, III ...................... | 345/156 |
| 2004/0212604 A1 * | 10/2004 | Ong ................................. | 345/179 |
| 2006/0012577 A1 | 1/2006 | Kyrola ........................... | 345/173 |

FOREIGN PATENT DOCUMENTS

EP 1076442 8/2000

OTHER PUBLICATIONS

PCT/IB2007/050422 International Search Report with Written Opinion, Jun. 21, 2007, 12 pages.
PCT Preliminary Report on Patentability issued in corresponding international application No. PCT/IB2007/050422, mailed Nov. 20, 2008, 6 pages.

* cited by examiner

*Primary Examiner* — Amr Awad
*Assistant Examiner* — Andre Matthews
(74) *Attorney, Agent, or Firm* — Snyder, Clark, Lesch & Chung, LLP

(57) ABSTRACT

A device may include an instrument-enabled user interface. The device may also include a switch to at least partially enable operations associated with user input via the user interface. Triggering of the switch may be based on a relative positioning of the instrument.

8 Claims, 4 Drawing Sheets

STYLUS ACTIVATED DISPLAY/KEY-LOCK

TECHNICAL FIELD OF THE INVENTION

The invention relates generally to communication devices and, more particularly, to providing control of input operations.

DESCRIPTION OF RELATED ART

Communication devices, such as cellular telephones, typically include a number of input mechanisms/user interfaces via which information may be input. For example, cellular telephones often include touch-screen panels and/or keys in the form of pressure-sensitive, electrically-sensitive, or photo-sensitive display overlays. Communication devices having touch-screen technology may include a "writing" instrument as an accessory, such as a stylus or pointer, which is used as an alternative to using one's finger to operate the touch-screen. Typically, the stylus is stowed in or on the communication device when it is not being used.

SUMMARY

According to one aspect, a mobile communication device may include a housing; a user input device; a stylus to interface with the user input device; and logic to prevent operation of the user input device when the stylus is in a first position.

Additionally, the logic may be configured to allow operation of the user input device when the stylus is in a second position.

Additionally, the first position and the second position may include contact between the stylus and the housing.

Additionally, the first position and the second position may include no contact between the stylus and the housing.

Additionally, the first position may include contact between the stylus and the housing and the second position may include no contact between the stylus and the housing.

Additionally, the logic may be configured to allow operation of the user input device when the stylus is displaced from the first position.

Additionally, the logic may be further configured to allow operation of the user input device for a predetermined amount of time following replacement of the stylus to the first position.

Additionally, the mobile communication device may further include a keypad, the keypad being operable when the stylus is in the first position.

Additionally, the mobile communication may further include a switch to allow operation of the user input device regardless of whether the stylus is in the first position.

Additionally, the user input device may be a touchscreen enabled display.

Additionally, the user input device may include at least one of a pressure-sensitive display, an acoustically-sensitive display, an electrically-sensitive display, or a photo-sensitive display.

Additionally, the logic may be further configured to allow operation of the user input device based on at least one of an amount of time the stylus is in the second position or an amount of time since the stylus has been used with the user input device.

According to another aspect, a method performed in a communication device including a display configured to be operated using a pointer, may include activating a display lock based on a stowed position of the pointer; and deactivating the display lock by displacing the pointer from the stowed position.

Additionally, activating the display lock may include the pointer engaging a switch associated with the communication device.

Additionally, activating the display lock may disable an operability of at least a portion of the display.

Additionally, the method may include overriding the display lock using another display lock provided on the communication device.

Additionally, displacing the pointer may include removing the pointer from a holder in the communication device.

Additionally, the method may further include reactivating the display lock by placing the pointer in another position.

According to still another aspect, a device may include a display means for receiving user input. The device may also include instrument means for operating the display means. The device may also include retainer means for releasably securing the instrument means to the device. The device may also include means for detecting the presence of the instrument means relative to the retainer means. The device may also include means for disabling activation of at least one function via the display means based on the detected presence of the instrument means.

Additionally, the device may include means for overriding the means for disabling when the instrument means is secured by the retainer means.

According to yet another aspect, a device may include an instrument-enabled user interface; and a switch to at least partially enable operations associated with user input via the user interface, an operation of the switch being based on a relative positioning of the instrument.

Additionally, the positioning of the instrument may include a stowed position and a non-stowed position associated with the device, the user interface being at least partially disabled when the instrument is in the stowed position.

Additionally, the switch may include logic to detect the positioning of the instrument.

Additionally, the device may further include logic to allow predetermined operations associated with user input via the user interface regardless of the relative positioning of the instrument.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1:
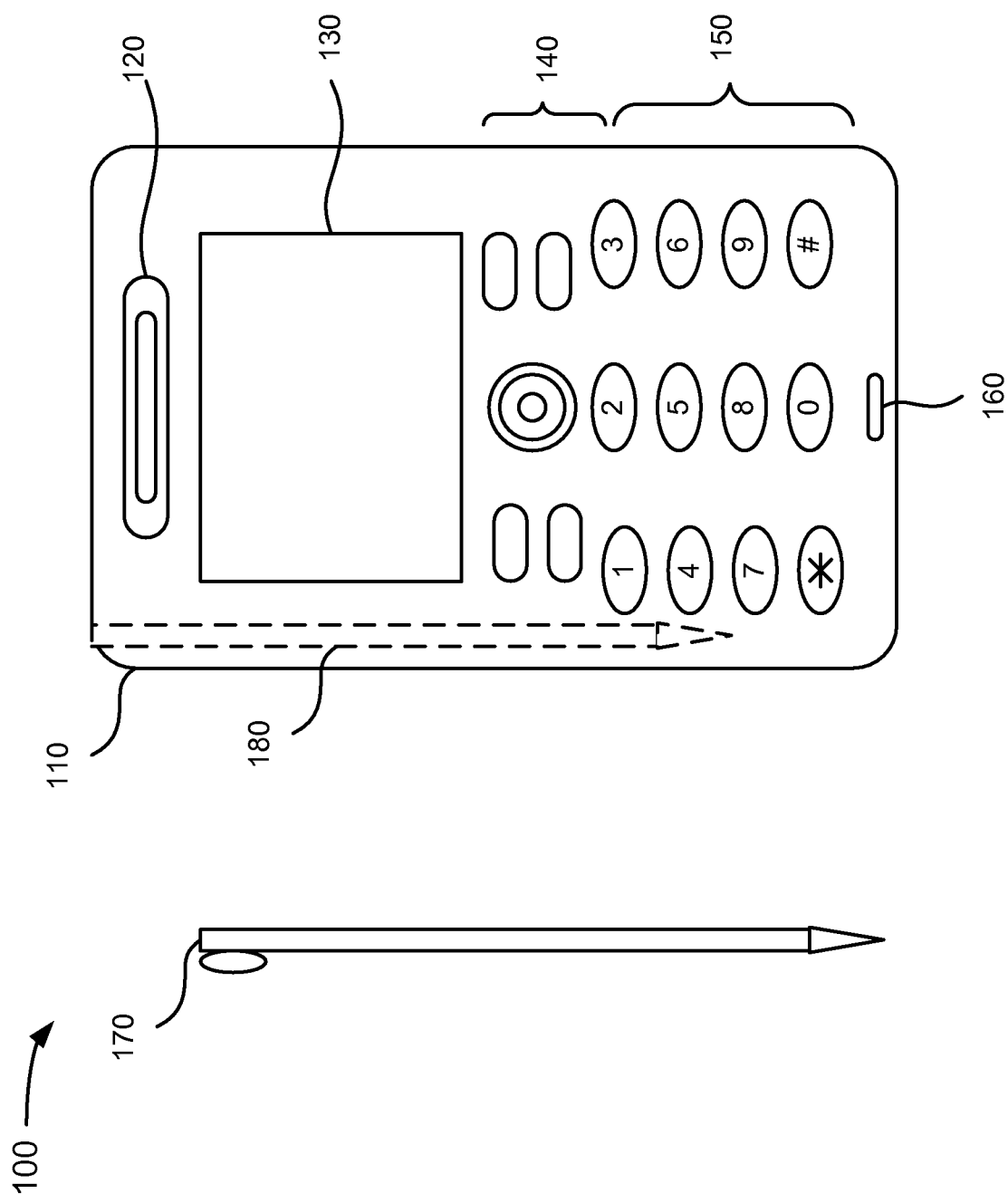
FIG. 1 is a diagram of an exemplary mobile terminal in which methods and systems described herein may be implemented.

FIG. 1 is a diagram of an exemplary mobile terminal 100 in which methods and systems described herein may be implemented. The invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. Mobile terminal 100 may also include media playing capability. It should also be understood that systems and methods described herein may also be implemented in other devices that include displays and media playing capability without including various other communication functionality.

Referring to FIG. 1, mobile terminal 100 may include a housing 110, a speaker 120, a display 130, control buttons 140, a keypad 150, a microphone 160, a stylus 170, and a slot 180. Housing 110 may include any structure to support the components of mobile terminal 100. Speaker 120 may include any mechanism(s)/device(s) to provide audible information to a user of mobile terminal 100.

Display 130 may include any device that provides visual information to the user. For example, display 130 may provide information regarding incoming or outgoing calls, games, phone books, the current time, etc. Display 130 may include a liquid crystal display (LCD) or some other type of display that displays graphical information to a user while mobile terminal 100 is operating. The LCD may be backlit using, for example, a number of light emitting diodes (LEDs).

In an exemplary implementation, as described in detail below, display 130 may also include additional elements/components that allow a user to interact with mobile terminal 100 to cause mobile terminal 100 to perform one or more operations, such as place a telephone call, play various media, etc. In one implementation, display 130 may function as a user input interface, such as a touch-screen or panel enabled display. For example, display 130 may include a pressure-sensitive (e.g., resistive), electrically-sensitive (e.g., capacitive), acoustically-sensitive (e.g., surface acoustic wave), photo-sensitive (e.g., infra-red), and/or any other type of display overlay that allows the display to be used as an input device.

Control buttons 140 may include any function keys that permit the user to interact with mobile terminal 100 to cause mobile terminal 100 to perform one or more operations, such as place a telephone call, play various media, etc. For example, control buttons 140 may include a dial button, hang up button, play button, etc. Control buttons 140 may also include a key-lock button that permits the user to activate/deactivate various input mechanisms, such as display 130, control buttons 140, keypad 150, and microphone 160, as described in more detail below. Keypad 150 may include a standard telephone keypad, for example, and/or additional function keys. Microphone 160 may receive audible information from the user, for example, to activate commands.

Stylus 170 may include an accessory instrument that may be used to manipulate display 130, control buttons 140, and/or keypad 150, for example, to enter data. In one implementation, stylus 170 may be a pointer or an inkless pen that may be used to "write" information onto or select information from graphics presented on display 130. Stylus 170 may correspond to a type of touch-screen of display 130. For example, where display 130 includes a pressure-sensitive surface, stylus 170 may include an elongated shaft with a pointed end for contacting the surface of display 130. Additionally, where display 130 includes an electrically-sensitive surface, an acoustically-sensitive surface, or a photo-sensitive surface, stylus 170 may include an end that emits a charge, sound, or light, respectively, that may be directed to the surface of display 130. Stylus 170 may include one or more surface features and/or be contoured to facilitate grasping and/or handling by a user.

Slot 180 may include any component to retain stylus 170 such that a user may retrieve stylus 170 from slot 180 for use with mobile terminal 100. In one implementation, slot 180 may be disposed within housing 110, for example, integrally formed therein and having a shape and/or size sufficient to receive at least a portion of stylus 170. In another implementation, slot 180 may be located externally to housing 110, for example, using retaining components on a surface of housing 110. In another implementation, stylus 170 may be stowed separately from housing 110, for example, attached to housing 110 by a tether. Slot 180 may include and/or be configured to actuate a switch mechanism associated with a type of display/key-lock. The switch mechanism may be actuated based on positioning of stylus 170, as will be described in more detail below. The switch mechanism may be of any type, e.g., mechanical, electrical, etc.

Figure 2:
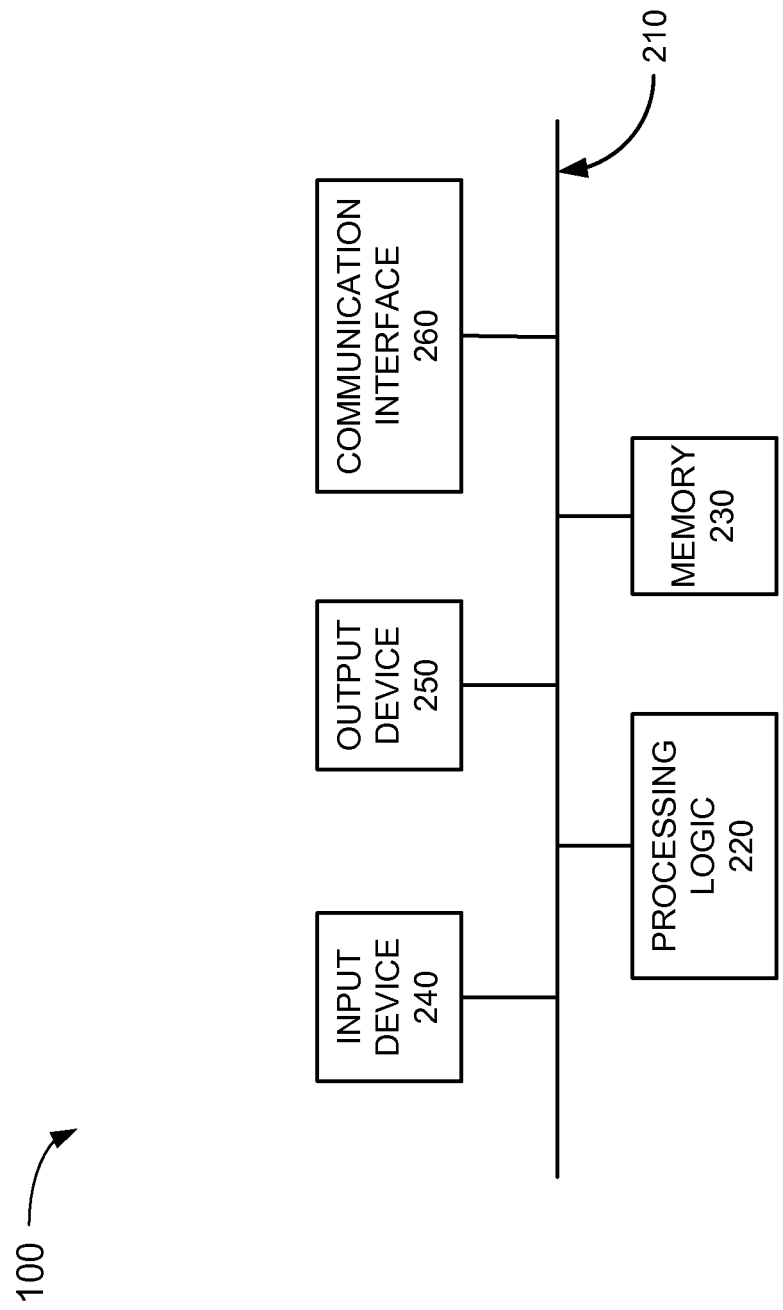
FIG. 2 is a diagram illustrating components of the mobile terminal of FIG. 1 according to an exemplary implementation.

FIG. 2 is a diagram illustrating components of mobile terminal 100 according to an exemplary implementation. Mobile terminal 100 may include processing logic 220, memory 230, input device 240, output device 250, communication interface 260, and a bus 210 that permits communication among the components of mobile terminal 100. One skilled in the art would recognize that mobile terminal 100 may be configured in a number of other ways and may include other or different elements. For example, mobile terminal 100 may include one or more power supplies (not shown). Mobile terminal 100 may also include one or more modulators, demodulators, encoders, decoders, etc., for processing data.

Processing logic 220 may include a processor, microprocessor, an application specific integrated circuit (ASIC), field programmable gate array (FPGA) or the like. Processing logic 220 may execute software instructions/programs or data structures to control operation of mobile terminal 100.

Memory 230 may include a random access memory (RAM) or another type of dynamic storage device that stores information and instructions for execution by processing logic 220; a read only memory (ROM) or another type of static storage device that stores static information and instructions for use by processing logic 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processing logic 220.

Instructions used by processing logic 220 may also, or alternatively, be stored in another type of computer-readable medium accessible by processing logic 220. A computer-readable medium may include one or more memory devices and/or carrier waves.

Input device 240 may include mechanisms that permit an operator to input information to mobile terminal 100, such as stylus 170, microphone 160, keypad 150, control buttons 140, display 130, a keyboard, a mouse, a pen, voice recognition and/or biometric mechanisms, etc.

Output device 250 may include one or more mechanisms that output information to the user, including a display, such as display 130, a printer, one or more wired or wireless speakers, such as speaker 120, etc. Output device 250 may also include a vibrator mechanism that causes mobile terminal 100 to vibrate when a call is received.

Communication interface 260 may include any transceiver-like mechanism that enables mobile terminal 100 to communicate with other devices and/or systems. For example, communication interface 260 may include a modem or an Ethernet interface to a LAN. Communication interface 260 may also include mechanisms for communicating via a network, such as a wireless network. For example, communication interface 260 may include one or more radio frequency (RF) transmitters, receivers and/or transceivers. Communication interface 260 may also include one or more antennas for transmitting and receiving RF data.

Mobile terminal 100 may provide a platform for a user to place and/or receive telephone calls, access the Internet, play various media, such as music files, video files, multi-media files, games, etc. Mobile terminal 100 may perform these operations in response to processing logic 220 executing sequences of instructions contained in a computer-readable medium, such as memory 230. Such instructions may be read into memory 230 from another computer-readable medium via, for example, communication interface 260. A computer-readable medium may include one or more memory devices and/or carrier waves. In alternative embodiments, hard-wired circuitry may be used in place of or in combination with software instructions to implement processes consistent with the invention. Thus, implementations described herein are not limited to any specific combination of hardware circuitry and software.

Figure 3:
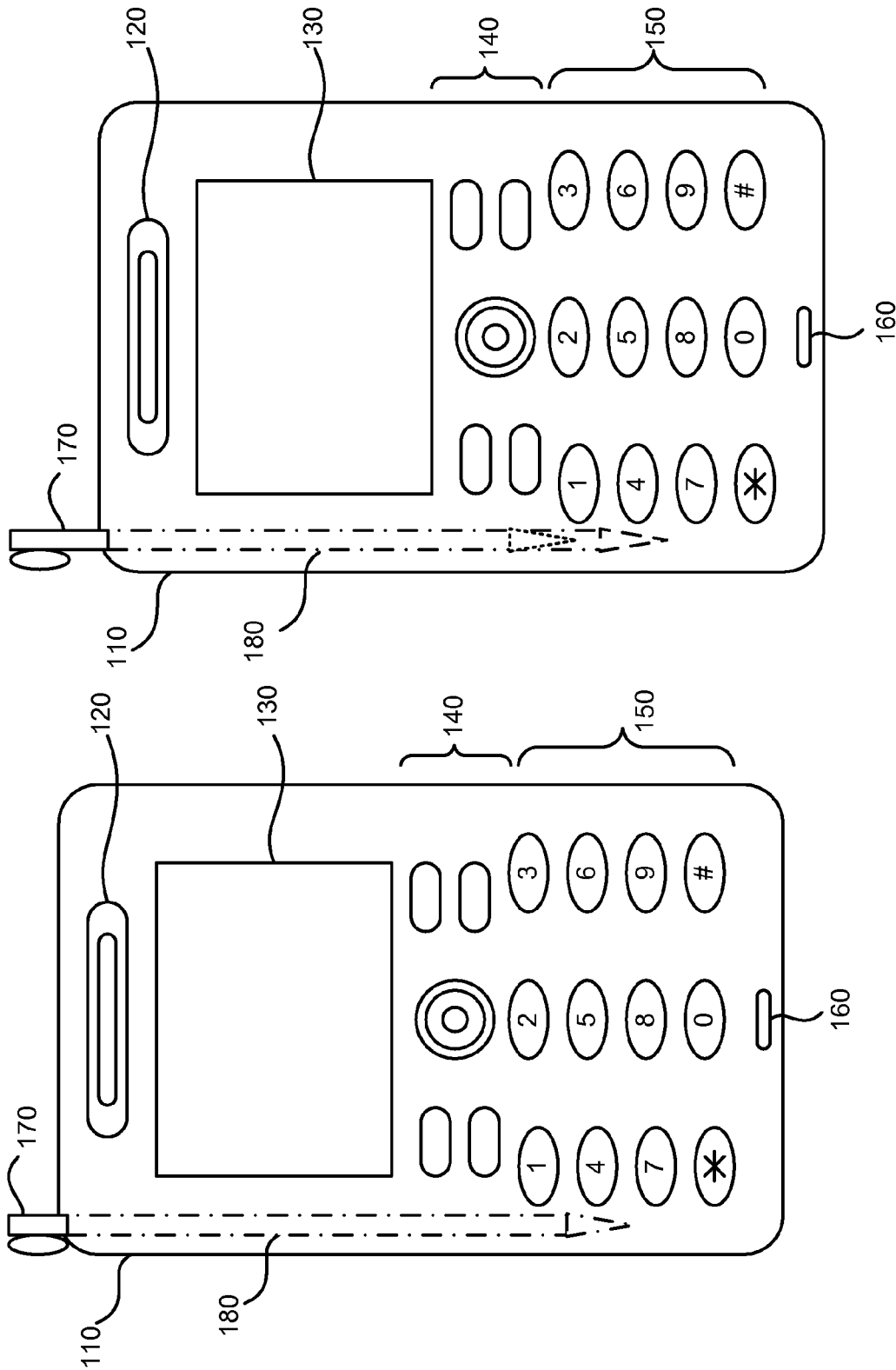
FIGS. 3A and 3B illustrate positioning of the stylus within the mobile terminal of FIG. 1 according to an exemplary implementation.

FIGS. 3A and 3B illustrate stylus 170 variously positioned in slot 180 in an exemplary implementation. Referring to FIG. 3A, stylus 170 may be inserted into slot 180 when not in use. Stylus 170 is illustrated as having an end portion that is accessible to a user for grasping when stylus 170 is in a fully inserted position in slot 180. Slot 180 may have dimensions that are substantially complementary to that of stylus 170 for accommodating stylus 170. Stylus 170 may be retained in slot 180 based on an engagement of the surfaces of stylus 170 and slot 180, which may be overcome by a user pulling stylus 170 out of slot 180. Other elements may be used to secure stylus 170 to slot 180 when not in use.

In an exemplary implementation, stylus 170 may be stowed in a less than fully-inserted position. For example, FIG. 3B illustrates stylus 170 stowed in an intermediate position within slot 180. As will be described below, operation of a display/key-lock may be based on a position of stylus 170 relative to slot 180, housing 110, and/or mobile terminal 100. In one implementation, stylus 170 may include one or more visible indicators on a surface thereof by which a user may determine a relative position of stylus 170 within slot 180, e.g., the depth of insertion. In another implementation, one or more audible sounds (e.g., clicking, chiming, etc.) produced upon insertion/removal may be used to indicate to a user a relative position of stylus 170 within slot 180. In another implementation, an indication of a relative position of stylus 170 within slot 180 may be indicated on display 130, for example, graphically and/or textually.

Figure 4:
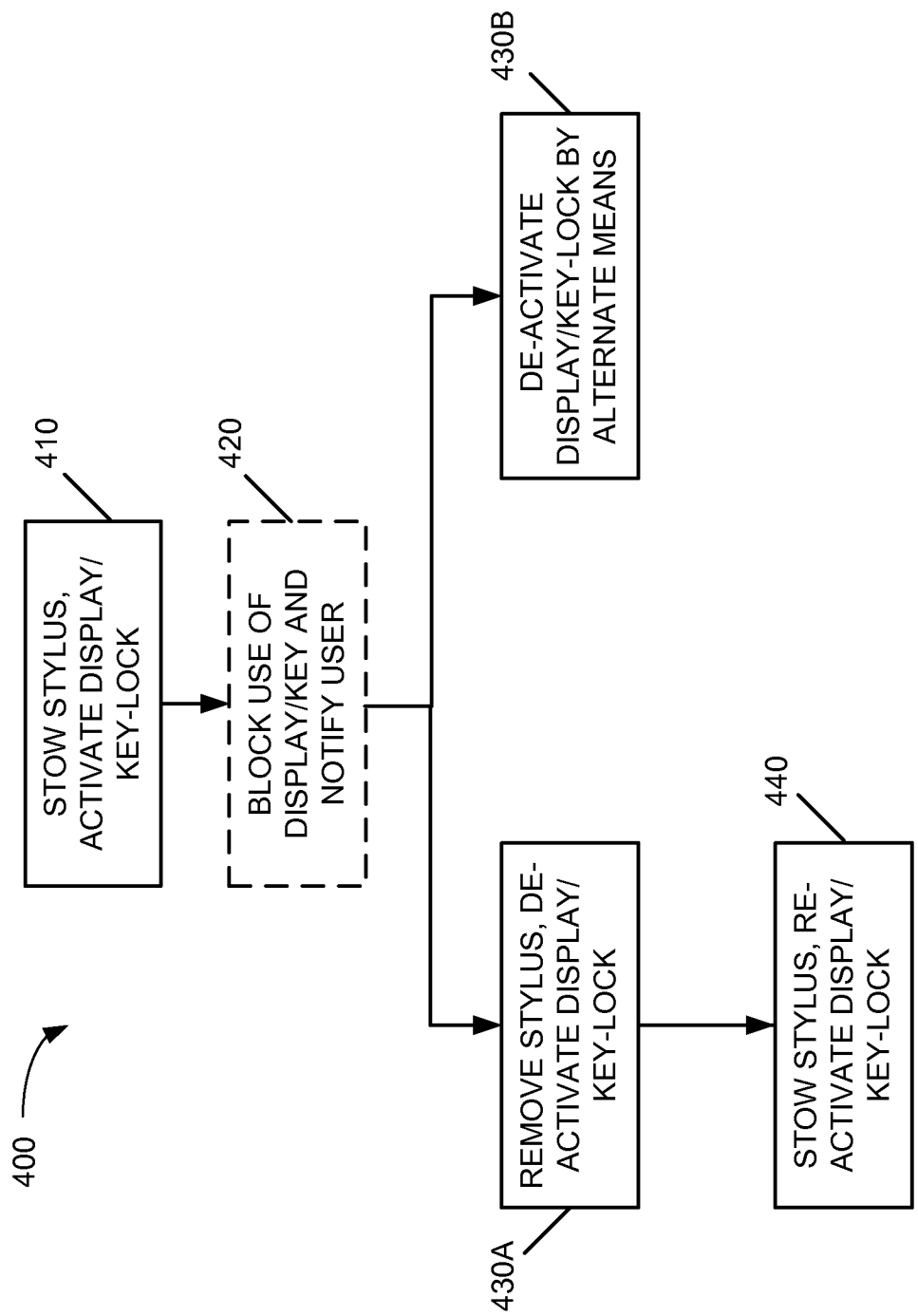
FIG. 4 is a flow diagram illustrating exemplary processing by the mobile terminal of FIG. 1.

FIG. 4 is a flow diagram illustrating an exemplary process 400 associated with the use of mobile terminal 100 in one implementation. Processing may begin, for example, when mobile terminal 100 powers up. In some implementations, mobile terminal 100 may allow the user to customize particular lock-out features based on his/her preferences. For example, input device 240 may provide a menu of options to the user. The menu may allow the user to select what input functions will be disabled under which conditions. For example, display/key-lock functions may be configured for one or more profiles associated with the operation of mobile terminal 100. Default display/key-lock configurations may be implemented in the absence of selections by the user. For example, display 130 and control buttons 140 may be inoperable while one or more keys in keypad 150 are operable, for instance, where mobile terminal 100 includes a flip-cover positionable over keypad 130.

Assume that mobile terminal 100 is configured such that when stylus 170 is fully inserted into slot 180, each of the input mechanisms, e.g., display 130, control buttons 140, and/or keypad 150, is in a locked (disabled) or a semi-locked (partially disabled) state. In one implementation, mobile terminal 100 may be placed in a display/key-lock state upon insertion of stylus 170 into slot 180 as depicted in FIG. 3A (act 410). In one implementation, the display/key-lock state may be activated by stylus 170 reaching a predetermined depth within slot 180 during its insertion. For example, when stylus 170 is fully inserted into slot 180, the display/key-lock may be activated. In one implementation, mobile terminal 100 may include a detector that detects a presence of stylus 170 within slot 180, for example, using an electrical and/or mechanical switch, and sends a signal, for example, to processing logic 220.

Alternatively, mobile terminal 100 may be configured such that fewer than all of the input mechanisms may be locked based on insertion of stylus 170 into slot 180. For example, only those input mechanisms with which stylus 170 interacts (e.g., display 130), may be locked. In addition, at least limited functionality of one or more of the input mechanisms may be maintained. For example, mobile terminal 100 may maintain emergency calling capability (e.g., 9-1-1) and/or other functionality in an otherwise display/key-locked state.

In the locked state, processing logic 220 may provide control instructions to input device 240 to disregard operations received via display 130, control buttons 140, and/or keypad 150. In the locked state, mobile terminal 100 may be configured to respond to a disabled operation of keypad 150, for example, by generating an indication to the user that keypad 150 is locked, for example, via display 130 and/or speaker 120 (act 420). In one implementation, a message, such as "emergency use only," may be displayed on display 130 when an attempt is made to use the locked input mechanisms for input other than a recognized emergency call.

The display/key-lock may be deactivated by displacing stylus 170 from the fully stowed position within slot 180, as shown in FIG. 3B (act 430A). That is, the associated switch may be actuated by removing stylus within slot 180 by a predetermined amount. In another implementation, deactivating the display/key-lock may be accomplished by completely removing stylus 170 from slot 180, i.e., break contact with mobile terminal 100 altogether. In another implementation, deactivating the display/key-lock may be accomplished by placing stylus 170 in a usable position, for example, when stylus is used to interact with an input mechanism (e.g., display 130) of mobile terminal 100. In another implementation, deactivating the display/key-lock may be accomplished by removing stylus 170 a predetermined distance from mobile terminal 100. For example, the switch mechanism associate with the display/key-lock may be wireless, and may be actuated based on a proximity of stylus 170 to mobile terminal 100.

In another implementation, deactivating the display/key-lock may be accomplished based on a time parameter. For example, deactivation of the display/key-lock may be delayed upon displacement of stylus 170 for a predetermined amount of time. When stylus 170 is returned to the stowed position in slot 180 before the predetermined period has elapsed, the display/key-lock may not be deactivated.

In one implementation, the display/key-lock condition may be deactivated by an alternate means, e.g., manual entry of a predetermined key combination on keypad 150, operating a designated control button 140, opening a flip-cover, etc. (act 430B). That is, mobile terminal 100 may be configured such that the display/key-lock on one or more of the input mechanisms may be overridden, rendering them operable without displacing stylus 170 from its stowed position within slot 180.

The display/key-lock may be re-activated by replacing stylus 170 to the fully stowed position within slot 180, as shown in FIG. 3A (act 440). In another implementation, the display/key-lock may be re-activated by replacing stylus 170 to another position within slot 180. That is, the triggering point within slot 180 for activating the display/key-lock may differ from the triggering point within slot 180 for re-activating the display/key-lock. For example, the display/key-lock may be re-activated as soon as stylus 170 makes initial contact with slot 180. In another implementation, re-activating the display/key-lock may also include a time parameter. For example, re-activation of the display/key-lock may be accomplished by non-replacement of stylus 170 within slot 180 after a predetermined amount of time and/or when stylus 170 is not being used to interact with the input mechanisms (e.g., display 130) of mobile terminal 100. In one implementation, re-activating the display/key-lock may be delayed for a predetermined amount of time after stylus 170 has been stowed.

In another implementation, mobile terminal 100 may include two separate slots 180. In this implementation, mobile terminal 100 may be configured such that when stylus 170 is in one of the slots 180, the display/key-lock is activated, and when stylus 170 is in the other slot 180, the display/key-lock is not activated.

CONCLUSION

Implementations described herein aid in preventing unintended operation of input mechanisms via a user interface. Advantageously, the input mechanisms may be easily enabled for operation when a user indicates intent to input information via the user interface, for example, by removing an inputting instrument from its holder, without any additional action required on the part of the user.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, aspects of the invention have been mainly described in the context of a mobile terminal. The invention, however, may be used with any type of electronic device with a user interface. For example, aspects of the invention may be implemented in a personal computer, laptop computer, personal digital assistant (PDA), MP3 player, or any other device that receives user input. In addition, aspects of the invention have been described with respect to a stylus. In other implementations, the accessory may be any instrument used to interact with input devices of a user interface.

Further, while series of acts has been described with respect to FIG. 4, the order of the acts may be varied in other implementations consistent with the invention. Moreover, non-dependent acts may be performed in parallel.

It will also be apparent to one of ordinary skill in the art that aspects of the invention may be implemented in methods and/or computer program products. Accordingly, the invention may be embodied in hardware and/or in software (including firmware, resident software, micro-code, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A mobile communication device comprising:
a housing including a stylus retainer;
a user input device including a touchscreen-enabled display;
a stylus to be received within the stylus retainer, and to interface with the user input device via contact with the touchscreen-enabled display; and
logic to:
permit interfacing with the user input device, via contact of the touchscreen-enabled display, for a predetermined amount of time following placement of the stylus in a first position within the stylus retainer;
prevent, following the predetermined amount of time, interfacing with the user input device, via contact of the touchscreen-enabled display, when the stylus is in the first position within the stylus retainer; and permit interfacing with the user input device, via the contact of the touchscreen-enabled display, when the stylus is in a second position within the stylus retainer, where a first trigger point within the stylus retainer for transitioning from a first state, of prevented interface with the user input device, to a second state, of permitted interface with the user input device, differs from a second trigger point within the stylus retainer for transitioning from the second state to the first state.

2. The mobile communication device of claim 1, where the logic is to permit the interfacing with the user input device when the stylus is displaced from the first position, by a particular amount, to the second position.

3. The mobile communication device of claim 1, further comprising a keypad, where the keypad is operable when the stylus is in the first position.

4. The mobile communication device of claim 1, further comprising:
   a switch to permit the interfacing with the user input device regardless of whether the stylus is in the first position.

5. The mobile communication device of claim 1, where the touchscreen-enabled display comprises at least one of a pressure-sensitive display, an acoustically-sensitive display, an electrically-sensitive display, or a photo-sensitive display.

6. The mobile communication device of claim 1, where the logic is further to permit the interfacing with the user input device based on at least one of an amount of time the stylus is in the second position or an amount of time since the stylus has been used with the user input device.

7. The mobile communication device of claim 1, where the stylus retainer comprises a slot, and the first trigger point is at an insertion depth within the slot that is less than an insertion depth within the slot for the second trigger points.

8. The mobile communication device of claim 7, where when the stylus is at an insertion depth within the slot that is between the first and second trigger point, the logic is to maintain the first state or the second state.

* * * * *